2,999,868
2,3-EPOXYALKYLSUCCINIC ACID DERIVATIVES AND THE PROCESS OF MAKING THEM

Benjamin Phillips, Paul S. Starcher, and Donald L. Heywood, Charleston, W. Va., assignors to Union Carbide Corporation, a corporation of New York
No Drawing. Filed June 23, 1958, Ser. No. 744,007
8 Claims. (Cl. 260—348)

This invention relates to a novel series of organic chemical compounds particularly adapted for use as plasticizers for halogen-containing vinyl-type resins. More particularly, this invention is directed to a novel series of epoxides of 2-alkenylsuccinic acid derivatives and to a process of making them.

The compounds of this invention may be conveniently represented by the following structural formula:

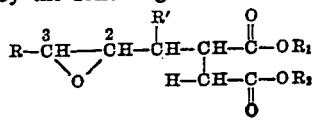

wherein R and R' represent hydrogen and lower alkyl groups containing from one through nine carbon atoms, such as methyl, ethyl, propyl, isopropyl, butyl, isobutyl, tertiary butyl, amyl, isoamyl, hexyl, heptyl and octyl radicals, the sum of the carbon atoms of R and R' being at least one and not greater than nine, and $R_1$ and $R_2$ represent alkyl, alkoxyalkyl, cycloalkyl, aryl, aralkyl, alkaryl and heterocyclic groups.

Preferred compounds embraced within the scope of this invention are the esters of 2,3-epoxyalkylsuccinic acid and may be conveniently represented by the following structural formula:

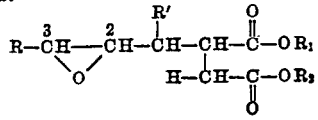

wherein R and R' represent hydrogen atoms and lower alkyl groups containing from one through nine carbon atoms, such as methyl, ethyl, propyl, isopropyl, butyl, isobutyl, tertiary butyl, amyl, isoamyl, hexyl, heptyl and octyl radicals, the sum of the carbon atoms of R and R' being at least one and not greater than nine, and $R_1$ and $R_2$ represent alkyl, alkoxyalkyl, cycloalkyl, aryl, aralkyl, alkaryl or heterocyclic groups, such as, for example, butyl, hexyl, octyl, ethoxyethyl, cyclohexyl, methylcyclohexyl, benzyl, phenyl, tolyl and tetrahydrofurfuryl groups.

Particularly preferred esters of 2,3-epoxyalkylsuccinic acids are the alkyl esters of said acids which can contain similar or dissimilar alkyl groups containing from four through twelve carbon atoms in said alkyl groups and wherein the total number of carbon atoms in the alkyl groups is not less than eight.

The compounds of this invention are useful as plasticizers for vinyl-type resins and particularly the halogen-containing vinyl-type resins. Compositions of vinyl-type resins containing the epoxyalkylsuccinic acid derivatives of this invention have been found to possess useful low temperatures and volatility properties for use in commercial applications, such as surface coatings and laminates. In addition, the epoxyalkylsuccinic acid derivatives, when combined with vinyl-type resins, provide compositions having improved heat and light stability characteristics.

The plasticizer compounds of this invention can be successfully used as plasticizers for polymers such as polyvinyl chloride, polystyrene, copolymers of vinyl chloride and vinyl acetate, polyvinyl acetate, polyvinyl butyral, and the like. Tests have shown that the plasticizer compounds are substantially compatible with substantially most commercial polyvinyl type polymers.

The compounds of this invention are prepared by reacting peracetic acid and a 2-alkenylsuccinic acid derivative as illustrated, in the case of didecyl 2-butenylsuccinate, by the following equation:

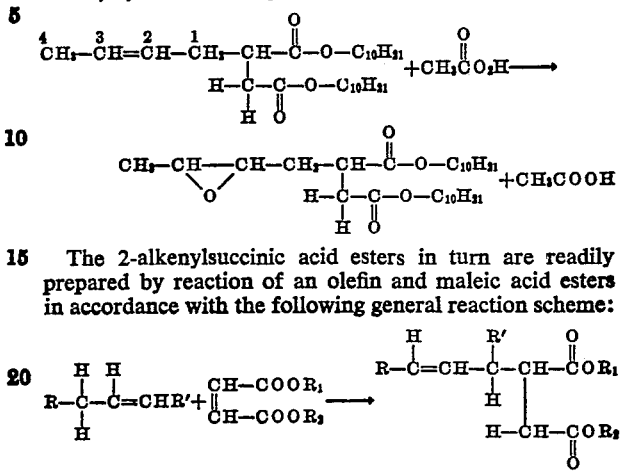

The 2-alkenylsuccinic acid esters in turn are readily prepared by reaction of an olefin and maleic acid esters in accordance with the following general reaction scheme:

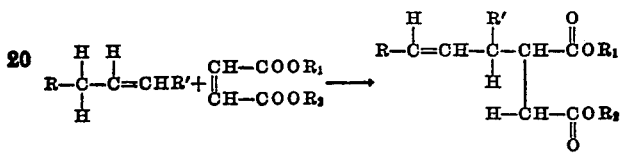

wherein $R_1$ and $R_2$ are as previously defined and R represents the residue of the monoolefin. This type of reaction is reported in the literature in an article by C. J. Albisetti et al. appearing in J. Am. Chem. Soc. Vol. 78, page 2637 (1956), which reviews the previous work of J. Ross et al., J. Am. Chem. Soc. 68, 1373 (1946); R. T. Arnold et al., J. Am. Chem. Soc. 70, 2590 (1948) and K. Alder et al., Ber. 85, 556 (1952).

In all cases this type of addition leads to the formation of a 2-alkenylsuccinic acid derivative which proceeds via direct attachment of the maleic moiety to the olefinic carbon followed by double bond migration and transfer of a hydrogen atom to saturate the maleic moiety. When the 2-alkenylsuccinic acid ester is reacted with an epoxidant such as peracetic acid the corresponding 2,3-epoxyalkylsuccinic acid ester is formed as shown supra.

The process of this invention is accomplished by reacting a 2-alkenylsuccinic acid derivative and peracetic acid at a temperature in the range of from about 10° C. to 140° C. More particularly, the process of this invention comprises reacting an alkenylsuccinic acid derivative and peracetic acid at a temperature in the range of from 10° C. to 140° C. and preferably at a temperature in the range of from 25° C. to 75° C. To insure complete epoxidation of the 2-alkenylsuccinic acid derivative, the reaction can be carried out in a slight molar excess of peracetic acid, if desired. In carrying out the process of this invention, the 2-alkenylsuccinic acid derivative is charged, in any convenient manner, to a reaction vessel, whereupon peracetic acid in acetone or other suitable solvent such as ethyl acetate is added over a period of time with stirring and cooling, if necessary. After the addition of the peracetic acid is complete, the reaction mixture is allowed to stand or heated until the reaction is complete. The titration of a sample of the reaction mixture for peracetic acid will indicate the extent of the reaction. After the reaction is substantially complete, the crude reaction product is worked up by removing the by-product acetic acid, solvent and any excess peracetic acid. These products can be removed azeotropically by distillation with ethylbenzene or other suitable azeotroping agent. After these low-boiling components have been stripped from the crude reaction product, the epoxide can be recovered by extraction, by crystallization, by precipitation with a non-solvent or by distillation. The lower molecular-weight compounds may be obtained as pure distillates, whereas the higher molecular-weight products are accepted as residue products.

The following examples will illustrate the practice of the invention:

EXAMPLE 1

*Preparation of dibutyl 2,3-epoxydodecylsuccinate*

To 479 grams (1.21 mols) of dibutyl 2-dodecenylsuccinate was added 556 grams of an acetone solution containing 24.7 percent peracetic acid (1.81 mols), containing 0.1 percent of an organic phosphate salt of the formula $Na_5(2\text{-ethylhexyl})_5(P_3O_{10})_2$ ("Victawet 35B") as a stabilizer, over the course of two hours, with stirring and occasional cooling. The reaction mixture was allowed to stand at room temperature for six hours and was then warmed to 40° C. for an additional ten hours, at the end of which time a titration of peracetic acid indicated that 76.3 percent of the theoretical amount of peracetic acid had been consumed. The reaction mixture was then fed over a three-hour period to 900 grams of ethylbenzene under reflux at reduced pressures and stripped of all volatile components to a temperature of 120° C. and a pressure of 3 mm. of Hg absolute. The product recovered was a viscous liquid.

EXAMPLE 2

*Preparation of di(2-ethylhexyl) 2,3-epoxypentylsuccinate*

Di(2-ethylhexyl) 2-pentenylsuccinate (348 grams, 0.85 mol) was stirred while 391 grams of a 24.9 percent peracetic acid-acetone solution (1.28 mols) was added over one hour. The temperature of this reaction mixture was allowed to rise to 38° C. The temperature was maintained in the range of 40° C. to 50° C. for a period of three hours, at the end of which time a titration for peracetic acid indicated that 97.5 percent of the theoretical amount of peracetic acid had been consumed. Volatile components were removed by feeding the solution twice through a steam-heated, long-tube vaporizer, first at 1500 cc./hour at an absolute pressure of 200 mm. of Hg and finally at a rate of 500 cc./hour at a pressure of 7 mm. of Hg. There was obtained 344 grams of di(2-ethylhexyl) 2,3-epoxypentylsuccinate characterized by the following physical properties:

| | |
|---|---|
| Physical state | Viscous liquid. |
| Freezing point | Glass, —45° C. |
| Boiling point | 269° C. |
| Acidity (as acetic acid) | 0.805 percent. |
| Iodine number | 14. |
| Density $D_4^{26}$ | 0.9559. |
| Refractive index $n_D^{30}$ | 1.4505. |
| Gardner color | 1. |

EXAMPLE 3

*Preparation of didecyl 2,3-epoxybutylsuccinate*

A solution of 25.3 percent peracetic acid in acetone (484 grams solution, 1.61 mols of peracetic acid) was added with stirring over a period of two hours to 558 grams (1.23 mols) of didecyl 2-butenylsuccinate. The temperature of the reaction mixture was maintained at 40° C. After an additional period of one hour at 40° C. and 18 hours at room temperature, a titration for peracetic acid indicated that the theoretical amount of peracetic acid had been consumed. The reaction mixture was thereupon fed to 500 milliliters of ethylbenzene refluxing at 45 mm. of Hg pressure. All low-boiling components were removed and after a final stripping at 120° C. and 3 mm. of Hg pressure, there was obtained 571 grams of a viscous residue product characterized by the following physical properties:

| | |
|---|---|
| Physical state | Viscous liquid. |
| Freezing point | —60° C. |
| Boiling point | 307° C. |
| Acidity | Nil. |
| Iodine number | 2.67. |
| Density $D_4^{26}$ | 0.9740. |
| Refractive index $n_D^{30}$ | 1.4606. |
| Gardner color | 2. |

EXAMPLE 4

*Preparation of di(2-ethylhexyl) 2,3-epoxyoctylsuccinate*

To 205 grams (0.454 mol) of di(2-ethylhexyl) 2-octenylsuccinate was added 244 grams of a 21.2 percent peracetic acid-acetone solution (0.681 mol of peracetic acid) over the course of one hour with stirring at a temperature of 40° C. After an additional 3½ hours at a temperature in a range of 40° C. to 50° C., a titration for peracetic acid indicated that the theoretical amount of peracetic acid had been consumed. Following azeotropic removal of the volatile components of the reaction mixture with ethylbenzene, the residue was heated at a temperature of 90° C. and a pressure of 3 mm. of Hg and afforded 210 grams of a viscous residue product having the following physical properties:

| | |
|---|---|
| Physical state | Viscous liquid. |
| Refractive index $n_D^{30}$ | 1.4551. |

EXAMPLE 5

*Preparation of di(2-ethylhexyl) 2,3-epoxyheptylsuccinate*

To 339 grams (0.772 mol) of di(2-ethylhexyl) 2-heptenylsuccinate was added 354 grams of a 24.9 percent solution of peracetic acid in acetone (1.16 mols of peracetic acid) over the course of one hour. The temperature was maintained at 40° C. Following an additional 3½ hours' heating period, the reaction mixture was stripped of volatile components and there was obtained 329 grams of di(2-ethylhexyl) 2,3-epoxyheptylsuccinate characterized by the following physical properties:

| | |
|---|---|
| Physical state | Viscous liquid. |
| Acidity as acetic acid | 1.29 percent. |
| Iodine number | 15.7. |
| Density $D_4^{26}$ | 0.9517. |
| Refractive index $n_D^{30}$ | 1.4516. |
| Gardner color | 1. |
| Ketone percent | Nil. |

EXAMPLE 6

*Preparation of di(2-ethylhexyl) 2,3-epoxyhexylsuccinate*

To 329 grams (0.778 mol) of di(2-ethylhexyl) 2-hexenylsuccinate was added 357 grams of a 24.9 percent solution of peracetic acid in acetone containing 1.17 mols of peracetic acid over a one-hour period at a temperature of 40° C. Peracetic acid titration after an additional five-hour reaction period at a temperature of 40° C., indicated that 99.5 percent of the theoretical amount of peracetic acid had been consumed. The reaction mixture was then added to 500 grams of ethylbenzene and stripped of all its volatile components by distillation at reduced pressures. After a final heating at a temperature of 110° C. and pressure of 4 mm. of Hg absolute, there was obtained 335 grams of di(2-ethylhexyl) 2,3-epoxyhexylsuccinate characterized by the following physical properties:

| | |
|---|---|
| Physical state | Viscous liquid. |
| Acidity as acetic acid | 0.211 percent. |
| Density $D_4^{26}$ | 0.948. |
| Refractive index $n_D^{30}$ | 1.4511. |
| Gardner color | 1. |

EXAMPLE 7

*Preparation of di(2-ethylhexyl) 2,3-epoxyhexylsuccinate*

A sample of di(2-ethylhexyl) 2-hexenylsuccinate prepared by condensation of 2-ethylbutene with maleic anhydride followed by esterification with 2-ethylhexanol was found to have a double bond equivalent weight of 424 by iodine titration (calculated: 424). To 300 grams (0.708 mol) of this di(2-ethylhexyl) 2-hexenylsuccinate was added 293 grams of 23.9 percent solution of peracetic acid in acetone containing 0.92 mol of peracetic acid over a one-hour period at a temperature of 40° C. After an additional three hours at 40° C., the reaction was complete and the solution was stripped of all low-boiling components by distillation with ethylbenzene at reduced pressures. Final traces of ethylbenzene were removed at 110° C. and 3.5 mm. of Hg pressure absolute and afforded 304 grams of di(2-ethylhexyl) 2,3-epoxyhexylsuccinate characterized by the following physical properties:

| | |
|---|---|
| Physical state | Viscous liquid. |
| Acidity as acetic acid | 0.56 percent. |
| Density $D_4^{26}$ | 0.9651. |
| Refractive index $n_D^{30}$ | 1.4542. |
| Gardner color | 1. |

EXAMPLE 8

*Preparation of di(2-ethylhexyl) 2,3-epoxynonylsuccinate*

To 550 grams (1.18 mols) of di(2-ethylhexyl) 2-nonenylsuccinate was added 524 grams of a 25.7 percent peracetic acid-acetone solution containing 1.77 mols of peracetic acid over a two-hour period while the temperature was maintained at 40° C. After heating an additional four hours, the reaction mixture was fed into 500 grams of refluxing ethylbenzene to remove acetone, acetic acid, and excess peracetic acid. Final traces of ethylbenzene were removed by heating at 115° C. at 3 mm. of Hg pressure absolute. There was obtained 569 grams of di(2-ethylhexyl) 2,3-epoxynonylsuccinate characterized by the following physical properties:

| | |
|---|---|
| Physical state | Viscous liquid. |
| Acidity as acetic acid | 0.61 percent. |
| Iodine number | 13.2. |
| Density $D_4^{26}$ | 0.9522. |
| Refractive index $n_D^{30}$ | 1.4555. |
| Gardner color | 1. |

EXAMPLE 9

*Preparation of 2-ethylhexyl decyl 2,3-epoxynonylsuccinate*

The unsaturated ester used in this experiment was obtained by esterifying 2-nonenylsuccinic anhydride with a mixture of 2-ethylhexanol and decanol. The ester thus prepared is a mixture of didecyl, 2-ethylhexyl decyl, and di(2-ethylhexyl) nonenylsuccinates, but is referred to herein as 2-ethylhexyl decyl 2-nonenylsuccinate. Correspondingly, the epoxide derived therefrom is a mixture of three epoxyesters and is referred to as 2-ethylhexyl decyl 2,3-epoxynonylsuccinate.

To 420 grams (0.854 mol) of 2-ethylhexyl decyl 2-nonenylsuccinate was added 378 grams of a 25.7 percent peracetic acid in acetone solution (containing 1.28 mols of peracetic acid) over a period of one hour with stirring at a temperature of 40° C. The reaction temperature was maintained for an additional six hours, at which time the reaction was complete. The reaction mixture was thereupon stripped of volatile components by feeding into 500 grams of refluxing ethylbenzene. There was obtained 425 grams of 2-ethylhexyl decyl 2,3-epoxynonylsuccinate characterized by the following phsyical properties:

| | |
|---|---|
| Physical state | Viscous liquid. |
| Acidity as acetic acid | 0.38 percent. |
| Iodine number | 11.6. |
| Density $D_4^{27}$ | 0.948. |
| Refractive index $n_D^{30}$ | 1.4563. |
| Gardner color | 3. |

EXAMPLE 10

*Preparation of didecyl 2,3-epoxyhexylsuccinate*

To 378 grams (0.788 mol) of didecyl 2-hexenylsuccinate was added 309 grams of a 25.2 percent solution of peracetic acid in acetone (containing 1.025 mols of peracetic acid) over a two-hour period. The temperature during the addition was allowed to rise to 40° C. where it was maintained with intermittent cooling. After an additional two hours at 40° C. and sixteen hours at room temperature, the reaction was complete, whereupon the reaction mixture was fed into refluxing ethylbenzene at reduced pressures. Final traces of volatile materials were removed by heating at 130° C. and 3 mm. of Hg pressure. There was obtained 387 grams of didecyl 2,3-epoxyhexylsuccinate characterized by the following physical properties:

| | |
|---|---|
| Physical state | Viscous liquid. |
| Freezing point | Glass, −56° C. |
| Boiling point | 272° C. |
| Acidity | Nil. |
| Iodine number | 19.3. |
| Density $D_4^{26.5}$ | 0.9462. |
| Refractive index $n_D^{30}$ | 1.4556. |
| Gardner color | 1. |

EXAMPLE 11

*Preparation of 2-ethylhexyl decyl 2,3-epoxyoctylsuccinate*

The unsaturated ester used in this experiment was obtained by esterifying 2-octenylsuccinic anhydride with a mixture of 2-ethylhexanol and decanols. The ester thus prepared is a mixture of didecyl, 2-ethylhexyl decyl, and di(2-ethylhexyl) octenylsuccinates, but is referred to herein as 2-ethylhexyl decyl 2-octenylsuccinate. Correspondingly, the epoxide derived therefrom is a mixture of three epoxy esters and is referred to as 2-ethylhexyl decyl 2,3-epoxyoctylsuccinate.

To 380 grams (0.79 mol) of 2-ethylhexyl decyl 2-octenylsuccinate was added 366 grams of a 23.6 percent peracetic acid-acetone solution containing 1.14 mols of peracetic acid. The temperature was allowed to rise to 40° C. and was maintained at that temperature during the addition period. After an additional 26 hours at room temperature, the reaction was 99 percent complete as indicated by a peracetic acid titration. The reaction mixture was added to refluxing ethylbenzene and stripped of all low-boiling components affording 365 grams of 2-ethylhexyl decyl 2,3-epoxyoctylsuccinate characterized by the following physical properties:

| | |
|---|---|
| Physical state | Viscous colorless liquid. |
| Freezing point | Glass, −60° C. |
| Boiling point | 309° C. |
| Acidity | Nil. |
| Iodine number | 8.04. |
| Density $D_4^{26}$ | 0.946. |
| Refractive index $n_D^{30}$ | 1.4560. |
| Gardner color | 1. |

EXAMPLE 12

*Plasticizer evaluation studies of epoxy esters and a vinyl chloride-vinyl acetate resin*

A vinyl copolymer resin, containing approximately 97 percent copolymerized vinyl chloride and 3 percent copolymerized vinyl acetate, was mechanically mixed with various amounts of epoxy compound indicated below, and 0.5 percent by weight of dibutyl tin maleate as a stabilizer and the resulting mixtures fluxed on a heated, differential, two-roll mill. The surface temperature of the rolls was controlled at 158° C. The fluxed sheets were removed from the roll mill after five minutes milling at 150° C. and strips of the approximately 30-mil sheet mounted on a stainless steel, wire mesh, screens which were then placed in a circulating-air oven at 158° C. Strips were removed from the oven at thirty-minute intervals and discoloration, with respect to the original sheet, determined by means of a Photovolt Reflection Meter, model 610, equipped with a Wratten C–5 blue filter. Color is reported as percent blue-light reflectance (percent BLR) as determined with the transparent sheet mounted on a block of magnesium carbonate which reflects 100 percent of the incident beam of blue light.

In reporting the results of the evaluations of the compositions, certain symbols and abbreviations have been employed for the sake of simplicity and brevity. Accordingly, the following symbols and abbreviations are defined as follows:

(a) ASTM=American Society of Testing Materials.
(b) $T_F$ and $T_4$=points corresponding to 135,000 and 10,000 pounds per square inch respectively on a stiffness-temperature curve obtained in accordance with the procedure set forth in the manual of ASTM D1043-51.
(c) Brittle temperature=the temperature obtained by means of low temperature impact test according to the procedure set forth in the manual of ASTM D746-52T.
(d) SPI volatility loss=value obtained in accordance with the procedure in the manual of ASTM D1203-52T.
(e) Durometer "A" hardness=an indentation measurement of hardness obtained with the Shore Durometer, "A" head.
(f) Sweat out=visual and manual examinations to detect any exudation of plasticizer that may appear as beads, a smear or a blush on the surface of the plasticized material. The observation is made after two weeks of aging at 25° C.

1. DI(2-ETHYLHEXYL) 2,3-EPOXYPENTYLSUCCINATE

| | | |
|---|---|---|
| Plasticizer (parts per hundred parts of resin) | 45 | 68 |
| Plasticizer, percent | 30.9 | 40.5 |
| Tensile, p.s.i. (24.5° C.) | 3,400 | 2,375 |
| Elongation, percent (24.5° C.) | 335 | 375 |
| Load at 100% Elong., p.s.i. | 1,920 | 1,000 |
| ASTM Stiffness Modulus, p.s.i. (24.5° C.) | 3,600 | 950 |
| $T_F$, °C | −21 | −40 |
| $T_4$, °C | 10 | −15 |
| Brittle temperature, °C | −26 | −37 |
| Percent Extraction: | | |
| Oil, 10 days at 25° C | 7.3 | 19.4 |
| Water, 10 days at 25° C | 3.9 | 4.5 |
| Durometer "A" Hardness (24.5° C.) | 80 | 63 |
| SPI Volatile Loss, percent in 24 hrs. at 70° C | 4.4 | 5.0 |
| Heat Stability Data: | | |
| Initial color, percent BLR | | 88 |
| Min. at 158° C. to 75% BLR | | 90 |
| Min. at 158° C. to 60% BLR | | 180 |
| Min. at 158° C. to 15% BLR | | 326 |
| Sweat-out | None | None |

2. DI(2-ETHYLHEXYL) 2,3-EPOXYHEPTYLSUCCINATE

| | | |
|---|---|---|
| Plasticizer (parts per hundred parts of resin) | 49 | 69 |
| Plasticizer, percent | 33.0 | 41.0 |
| Tensile, p.s.i. (24.5° C.) | 3,080 | 2,300 |
| Elongation, percent (24.5° C.) | 335 | 365 |
| Load at 100% Elong., p.s.i. (24.5° C.) | 1,800 | 1,000 |
| ASTM Stiffness Modulus, p.s.i. (24.5° C.) | 3,100 | 900 |
| $T_F$, °C | −25 | −40 |
| $T_4$, °C | 6 | −13 |
| Brittle temperature, °C | −26 | −36 |
| Percent Extraction: | | |
| Oil, 10 days at 25° C | 8.2 | 18.4 |
| Water, 10 days at 25° C | 1.3 | 1.6 |
| Durometer "A" Hardness (24.5° C.) | 80 | 63 |
| SPI Volatile Loss, percent in 24 hrs. at 70° C | 2.0 | 2.8 |
| Heat Stability Data: | | |
| Initial color, percent BLR | | 87 |
| Min. at 158° C. to 75% BLR | | 60 |
| Min. at 158° C. to 60% BLR | | 180 |
| Min. at 158° C. to 15% BLR | | 334 |
| Sweat-out | None | None |

3. DI(2-ETHYLHEXYL) 2,3-EPOXYHEXYLSUCCINATE

| | | |
|---|---|---|
| Plasticizer (parts per hundred parts of resin) | 47 | 69 |
| Plasticizer, percent | 32.1 | 41.0 |
| Tensile, p.s.i. (24.5° C.) | 3,220 | 2,450 |
| Elongation, percent (24.5° C.) | 335 | 400 |
| Load at 100% Elong., p.s.i. (24.5° C.) | 1,770 | 1,000 |
| ASTM Stiffness Modulus, p.s.i. (24.5° C.) | 3,900 | 900 |
| $T_F$, °C | −28 | −41 |
| $T_4$, °C | 6 | −16 |
| Brittle temperature, °C | −28 | −36 |
| Percent Extraction: | | |
| Oil, 10 days at 25° C | 10.8 | 21.4 |
| Water, 10 days at 25° C | 2.0 | 2.0 |
| Durometer "A" Hardness (24.5° C.) | 80 | 61 |
| SPI Volatile Loss, percent in 24 hrs. at 70° C | 3.2 | 3.6 |
| Heat Stability Data: | | |
| Initial color, percent BLR | | 88 |
| Min. at 158° C. to 75% BLR | | 90 |
| Min. at 158° C. to 60% BLR | | 270 |
| Min. at 158° C. to 15% BLR | | 413 |
| Sweat-out | None | None |

4. DI(2-ETHYLHEXYL) 2,3-EPOXYNONYLSUCCINATE

| | | |
|---|---|---|
| Plasticizer (parts per hundred parts of resin) | 56 | 88 |
| Plasticizer, percent | 35.8 | 46.8 |
| Tensile, p.s.i. (24.5° C.) | 2,880 | 2,150 |
| Elongation, percent (24.5° C.) | 290 | 365 |
| Load at 100% Elong., p.s.i. (24.5° C.) | 1,950 | 1,000 |
| ASTM Stiffness Modulus, p.s.i. (24.5° C.) | 2,650 | 700 |
| $T_F$, °C | −17 | −36 |
| $T_4$, °C | 11 | −8 |
| Brittle temperature, °C | −17 | −30 |
| Percent Extraction: | | |
| Oil, 10 days at 25° C | 6.7 | 17.0 |
| Water, 10 days at 25° C | 1.5 | 2.1 |
| Durometer "A" Hardness (24.5° C.) | 80 | 63 |
| SPI Volatile Loss, percent in 24 hrs. at 70° C | 2.0 | 2.6 |
| Heat Stability Data: | | |
| Initial color, percent BLR | 86 | |
| Min. at 158° C. to 75% BLR | 36 | |
| Min. at 158° C. to 60% BLR | 69 | |
| Min. at 158° C. to 15% BLR | 174 | |
| Sweat-out | None | None |

5. DECYL 2-ETHYLHEXYL 2,3-EPOXYNONYLSUCCINATE

| | | |
|---|---|---|
| Plasticizer (parts per hundred parts of resin) | 65 | 80 |
| Plasticizer, percent | 39.5 | 44.4 |
| Tensile, p.s.i. (24.5° C.) | 2,545 | 2,170 |
| Elongation, percent (24.5° C.) | 320 | 340 |
| Load at 100% Elong., p.s.i. (24.5° C.) | 1,570 | 1,000 |
| ASTM Stiffness Modulus, p.s.i. (24.5° C.) | 2,375 | 1,245 |
| $T_F$, °C | −27 | −35 |
| $T_4$, °C | 4 | −6 |
| Brittle temperature, °C | −22 | −28 |
| Percent Extraction: | | |
| Oil, 10 days at 25° C | 20.3 | 25.7 |
| Water, 10 days at 25° C | 1.6 | 1.8 |
| Durometer "A" Hardness (24.5° C.) | 80 | 70 |
| SPI Volatile Loss, percent in 24 hrs. at 70° C | 2.2 | 2.5 |
| Heat Stability Data: | | |
| Initial color, percent BLR | 85 | |
| Min. at 158° C. to 75% BLR | 38 | |
| Min. at 158° C. to 60% BLR | 75 | |
| Min. at 158° C. to 15% BLR | 180 | |
| Sweat-out | None | None |

6. DIDECYL 2,3-EPOXYHEXYLSUCCINATE

| | | |
|---|---|---|
| Plasticizer (parts per hundred parts of resin) | 58 | 80 |
| Plasticizer, percent | 36.8 | 44.3 |
| Tensile, p.s.i. (24.5° C.) | 2,920 | 2,270 |
| Elongation, percent (24.5° C.) | 335 | 360 |
| Load at 100% Elong., p.s.i. (24.5° C.) | 1,630 | 1,000 |
| ASTM Stiffness Modulus, p.s.i. | 1,420 | 545 |
| $T_F$, °C | −24 | −37 |
| $T_4$, °C | 6 | −10 |
| Brittle temperature, °C | −21 | −30 |
| Percent Extraction: | | |
| Oil, 10 days at 25° C | 10.3 | 21.6 |
| Water, 10 days at 25° C | 1.7 | 2.1 |
| Durometer "A" Hardness (24.5° C.) | 80 | 64 |
| SPI Volatile Loss, percent in 24 hrs. at 70° C | 2.7 | 4.0 |
| Heat Stability Data: | | |
| Initial color, percent BLR | | 86 |
| Min. at 158° C. to 75% BLR | | 72 |
| Min. at 158° C. to 60% BLR | | 160 |
| Min. at 158° C. to 15% BLR | | 268 |
| Sweat-out | None | None |

7. DI(2-ETHYLHEXYL) 2,3-EPOXYHEXYLSUCCINATE

| | | |
|---|---|---|
| Plasticizer (parts per hundred parts of resin) | 65 | 90 |
| Plasticizer, percent | 39.3 | 47.5 |
| Tensile, p.s.i. (24.5° C.) | 2,820 | 2,220 |
| Elongation, percent (24.5° C.) | 330 | 360 |
| Load at 100% Elong., p.s.i. (24.5° C.) | 1,625 | 1,000 |
| ASTM Stiffness Modulus, p.s.i. (24.5° C.) | 1,640 | 720 |
| $T_F$, °C | −22 | −35 |
| $T_4$, °C | 7 | −8 |
| Brittle temperature, °C | −20 | −31 |
| Percent Extraction: | | |
| Oil, 10 days at 25° C | 7.7 | 17.5 |
| Water, 10 days at 25° C | 5.3 | 6.5 |
| Durometer "A" Hardness (24.5° C.) | 80 | 66 |
| SPI Volatile Loss, percent in 24 hrs. at 70° C | 6.4 | 7.3 |
| Heat Stability Data: | | |
| Initial color, percent BLR | 83 | |
| Min. at 158° C. to 75% BLR | 7 | |
| Min. at 158° C. to 60% BLR | 22 | |
| Min. at 158° C. to 15% BLR | 112 | |
| Sweat-out | None | None |

8. DECYL 2-ETHYLHEXYL 2,3-EPOXYOCTYLSUCCINATE

| Plasticizer (parts per hundred parts of resin) | 62 | 87 |
|---|---|---|
| Plasticizer, percent | 38.4 | 46.5 |
| Tensile, p.s.i. (24.5° C.) | 2,720 | 2,090 |
| Elongation, percent (24.5° C.) | 305 | 340 |
| Load at 100% Elong., p.s.i. (24.5° C.) | 1,730 | 1,000 |
| ASTM Stiffness Modulus, p.s.i. (24.5° C.) | 1,930 | 820 |
| $T_f$, °C | −23 | −36 |
| $T_4$, °C | 8 | −8 |
| Brittle temperature, °C | −26 | −32 |
| Percent Extraction: | | |
| Oil, 10 days at 25° C | 19.7 | 27.4 |
| Water, 10 days at 25° C | 1.4 | 1.6 |
| Durometer "A" Hardness (24.5° C.) | 80 | 66 |
| SPI Volatile Loss, percent in 24 hrs. at 70° C | 2.2 | 2.5 |
| Heat Stability Data: | | |
| Initial color, percent BLR | 88 | |
| Min. at 158° C. to 75% BLR | 63 | |
| Min. at 158° C. to 60% BLR | 96 | |
| Min. at 158° C. to 15% BLR | 164 | |
| Sweat-out | None | None |

EXAMPLE 13

*Compatibility studies of 2-ethylhexyl decyl 2,3-epoxyoctylsuccinate with various resins*

The compatibility of 2-ethylhexyl decyl 2,3-epoxyoctylsuccinate with various resins was tested in the following manner. A basic recipe was prepared comprising 69.5 parts of resin, 30 parts of the epoxyester and 0.5 part of dibutyl tin dimaleate. Samples were prepared by adding the epoxyester plasticizer to a solution of a resin in such quantities so as to give the desired ratios. The mixture was allowed to dry until essentially free of solvent. The samples were then tested and rated as to compatibility of the epoxyester with the resin. The results of these tests are as follows:

TABLE I

| Test No. | Resin | Result |
|---|---|---|
| 1 | Polyvinyl chloride | compatible. |
| 2 | Vinyl chloride-vinyl acetate copolymer | Do. |
| 3 | Vinyl chloride-diisopropyl fumarate copolymer | Do. |
| 4 | Polystyrene | Do. |

This application is a continuation-in-part of application Serial No. 523,388 filed July 20, 1955, now abandoned.

What is claimed is:

1. Compounds of the formula:

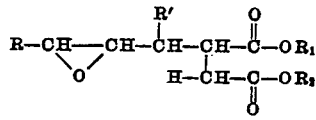

wherein R and R' represent members selected from the group consisting of hydrogen atoms and lower alkyl groups of from one through nine carbon atoms, the sum of the carbon atoms of R and R' being at least one and not greater than nine and $R_1$ and $R_2$ represent alkyl groups containing from four through twelve carbon atoms.

2. Dibutyl 2,3-epoxydodecylsuccinate.
3. Didecyl 2,3-epoxybutylsuccinate.
4. Di(2-ethylhexyl) 2,3-epoxyoctylsuccinate.
5. Di(2-ethylhexyl) 2,3-epoxyheptylsuccinate.
6. Di(2-ethylhexyl) 2,3-epoxyhexylsuccinate.
7. Di(2-ethylhexyl) 2,3-epoxynonylsuccinate.
8. Didecyl 2,3-epoxyhexylsuccinate.

References Cited in the file of this patent

UNITED STATES PATENTS

| 2,464,137 | Levy et al. | Mar. 8, 1949 |
| 2,671,064 | Cowell et al. | Mar. 2, 1954 |